United States Patent
Wei et al.

(10) Patent No.: US 9,037,433 B2
(45) Date of Patent: May 19, 2015

(54) PORTABLE DEVICE AND ORIENTATION DETECTION METHOD THEREFOR

(75) Inventors: Chih-Chun Wei, Taoyuan County (TW); Pei-Hao Huang, Taoyuan County (TW); Hui-Jan Ko, Taoyuan County (TW); Yu-Hsien Yang, Taoyuan County (TW); Yuan-Yao Tu, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 609 days.

(21) Appl. No.: 13/369,812

(22) Filed: Feb. 9, 2012

(65) Prior Publication Data

US 2013/0060515 A1  Mar. 7, 2013

Related U.S. Application Data

(60) Provisional application No. 61/531,520, filed on Sep. 6, 2011.

(51) Int. Cl.
  *G01P 15/00* (2006.01)
  *G06F 1/32* (2006.01)
  *G01P 15/18* (2013.01)

(52) U.S. Cl.
  CPC .............. *G06F 1/3206* (2013.01); *G01P 15/18* (2013.01)

(58) Field of Classification Search
  None
  See application file for complete search history.

(56) References Cited

U.S. PATENT DOCUMENTS

| | | | |
|---|---|---|---|
| 7,289,102 B2* | 10/2007 | Hinckley et al. | 345/156 |
| 8,139,026 B2* | 3/2012 | Griffin | 345/156 |
| 8,493,323 B2* | 7/2013 | Griffin | 345/158 |
| 2008/0034321 A1 | 2/2008 | Griffin | |
| 2010/0066751 A1 | 3/2010 | Ryu et al. | |
| 2010/0167792 A1 | 7/2010 | Chen et al. | |

FOREIGN PATENT DOCUMENTS

| | | |
|---|---|---|
| CN | 101668351 A | 3/2010 |
| CN | 101674410 A | 3/2010 |
| CN | 101765188 A | 6/2010 |
| CN | 102150098 A | 8/2011 |
| TW | 201022926 A | 6/2010 |
| TW | M387437 U1 | 8/2010 |
| WO | 2010/028403 A1 | 3/2010 |

* cited by examiner

*Primary Examiner* — Aditya Bhat

(74) *Attorney, Agent, or Firm* — Birch, Stewart, Kolasch & Birch, LLP

(57) ABSTRACT

An embodiment of the invention provides an orientation detection method for a portable device. The method comprises acquiring an accelerometer data, determining whether the portable device is in a flat status, determining whether the portable device is in a stable status, and when the portable device is determined in both the flat status and the stable status, stopping acquiring the accelerometer data until receiving an enable signal.

18 Claims, 6 Drawing Sheets

PORTABLE DEVICE AND ORIENTATION DETECTION METHOD THEREFOR

CROSS REFERENCE TO RELATED APPLICATIONS

This application claims the benefit of U.S. Provisional Application No. 61/531,520 filed 6 Sep. 2011, the entirety of which is incorporated by reference herein.

BACKGROUND OF THE INVENTION

1. Field of the Invention

The present invention relates to a portable device, and in particular relates to the portable device with orientation detection mechanism.

2. Description of the Related Art

In recent years, portable devices, such as mobile phones, smart phones or personal digital assistants, have become ubiquitous and most people have become more and more dependent on portable devices in their the daily lives. The design of the portable devices is moving toward light, thin, short, and small specification, which limits the space for batteries. Furthermore, more and more functions, devices or modules are being integrated into portable devices, such that overall power required for the portable devices is increasing. Thus, power consumption has become an increasingly important factor in the design of portable devices.

BRIEF SUMMARY OF THE INVENTION

An embodiment of the invention provides an orientation detection method for a portable device. The method comprises acquiring an accelerometer data, determining whether the portable device is in a flat status, determining whether the portable device is in a stable status, and when the portable device is determined in both the flat status and the stable status, stopping acquiring the accelerometer data until receiving an enable signal.

Another embodiment of the invention provides a portable device comprising an accelerometer and a processor. The processor queries the accelerometer to acquire an accelerometer data to determine whether the portable device is in both the flat status and the stable status, and when the portable device is determined in both the flat status and the stable status, the processor stops querying the accelerometer data until the processor receives an enable signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A G-sensor is usually an accelerometer. It measures the forces that act on it during changes in velocity. Generally, portable devices or handheld devices use G-sensors to align a screen based on upon which direction the portable device is held. It changes the orientation according to the accelerometer output. According to some portable device implementations with G-sensors, the operating system or the processor of the portable device may query accelerometer data at a predetermined sample rate to determine the orientation of the portable device. However, a high sample rate wastes processor resources when data is queried. Thus, the present disclosure provides an innovative orientation detection algorithm to reduce power consumption when the G-sensor is queried.

Figure 1:
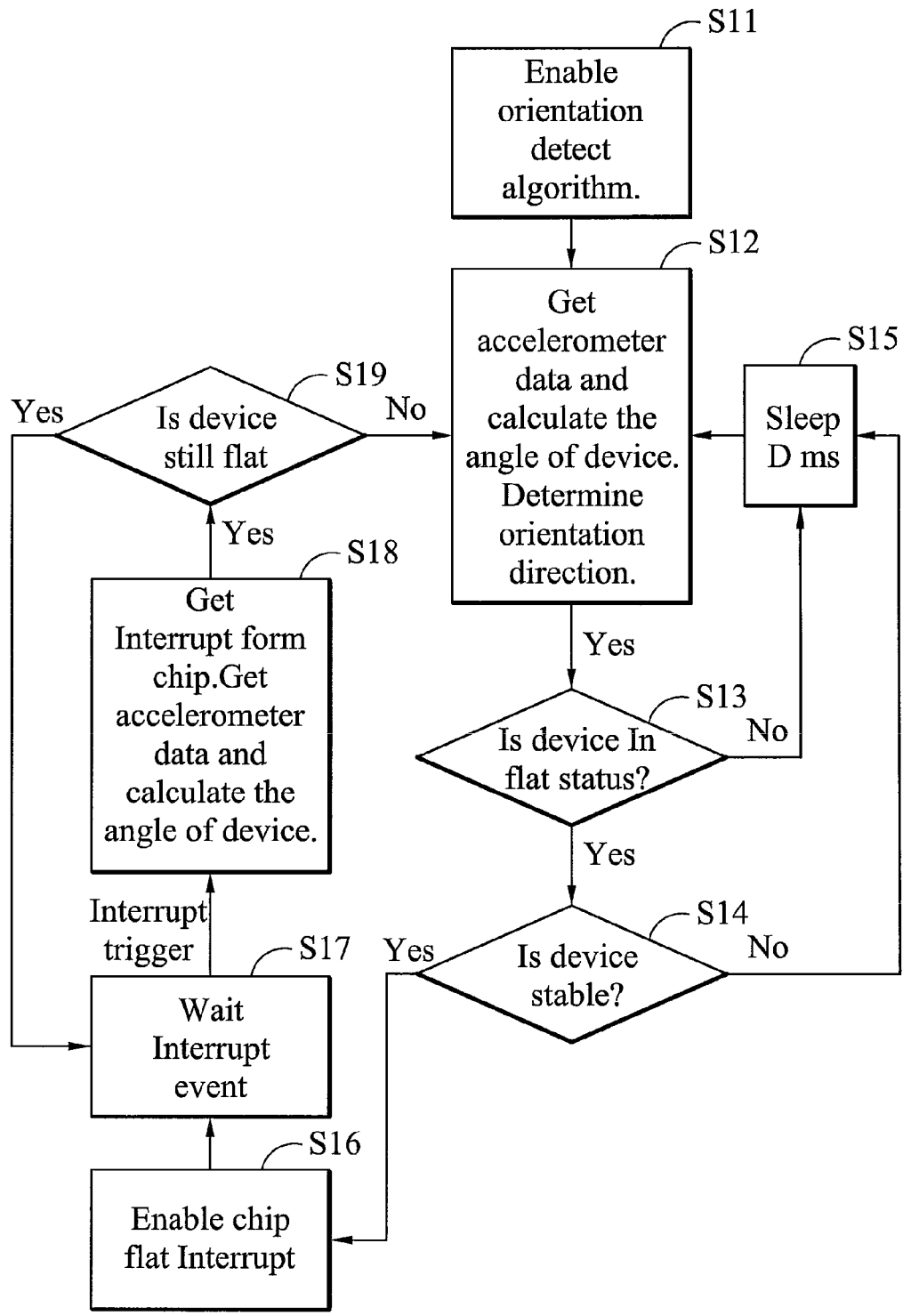
FIG. 1 is a flowchart of an orientation detection algorithm according to an embodiment of the invention.

Please refer to FIG. 1. FIG. 1 is a flowchart of an orientation detection algorithm according to an embodiment of the invention. In step S11, the orientation detection algorithm is enabled. The timing to enable the orientation detection algorithm can be determined according to need of a designer. The orientation detection algorithm is enabled when an application program that requires information of device orientation for processing is executed. These application program lists may include the desktop program which is automatically launched when device is turned on. For example, some browser application or gaming required orientation information to align the screen.

In step S12, the processor (or called CPU) of the portable device acquires the accelerometer data from the G-sensor and calculates current angles (tilt and rotation angle) of the portable device. The processor can further determine an orientation direction according to two calculated angles.

After calculating the current angle, step S13 is performed. In step S13, the orientation detection algorithm determines whether the portable device is in a flat status. The flat status is determined according to an absolute value of a tilt angle and a rotation angle of the portable device. If the absolute value is less than Zt (tilt angle) and Zr (rotation angle) degrees, the portable device is determined to be in a flat status. In other words, if the tilt angle and the rotation angle of the portable device range from –Zt degrees to Zt degrees (tilt angle) and from –Zr to Zr degrees (rotation angle), the portable device is determined to be in a flat status. Note that both the tilt angle and the rotation angle of the portable device are considered for the determination of the flat status of the portable device in this embodiment.

When the portable device is not in the flat status, step S15 is performed, wherein the processor sleeps for a first duration (S1-A duration), such as 200 ms, and then the processor repeats the operation of step S12. When the portable device is in the flat status, step S14 is performed, wherein the processor determines whether the portable device is in a stable condition. The stable condition is determined according to a second duration (S1-B duration) in which the portable device is in the flat status. If the second duration exceeds a threshold (S1-C duration as threshold), the portable device is determined to be in the stable condition, and step S16 is performed. If the second duration does not exceed the threshold, step S15 is performed, wherein the processor sleeps for a first duration, such as 200 ms, and then the processor repeats the operation of step S12.

In step S16, the processor of the portable device enables a flat interrupt function of the G-sensor. It is noted that not every G-sensor has the flat interrupt function, and the present orientation detection algorithm is customized for those G-sensors with the flat interrupt function. One pin of the G-sensor is coupled to a GPIO pin of the processor of the portable device. When the G-sensor detects that the portable device is not in the flat status, the G-sensor transmits a flat interrupt signal to the processor. In this embodiment, the steps S13 and S14 are executed by a processor of the portable device, but the flat status in steps S16 and S17 are determined by the G-sensor. In step S17, the G-sensor waits for the interrupt event. In this embodiment, the interrupt event represents the posture status change of the portable device. For example, if the tilt angle or the rotation angle of the portable device exceeds a predetermined angle, the interrupt event is determined to have occurred and the G-sensor outputs a flat interrupt signal to the processor of the portable device. In step S17, the processor of the portable device does not query for the accelerometer data to reduce waste of resources and power consumption of the processor.

In step S18, after the processor receives the flat interrupt signal, the processor acquires the accelerometer data to calculate the tilt angle and the rotation angle of the portable device. Then, step S19 is performed to determine whether the portable device is still in the flat status. If the processor determines that the portable device is still in the flat status, step S17 is performed. If the processor determines that the portable device is not in the flat status, step S12 is performed.

Figure 2:
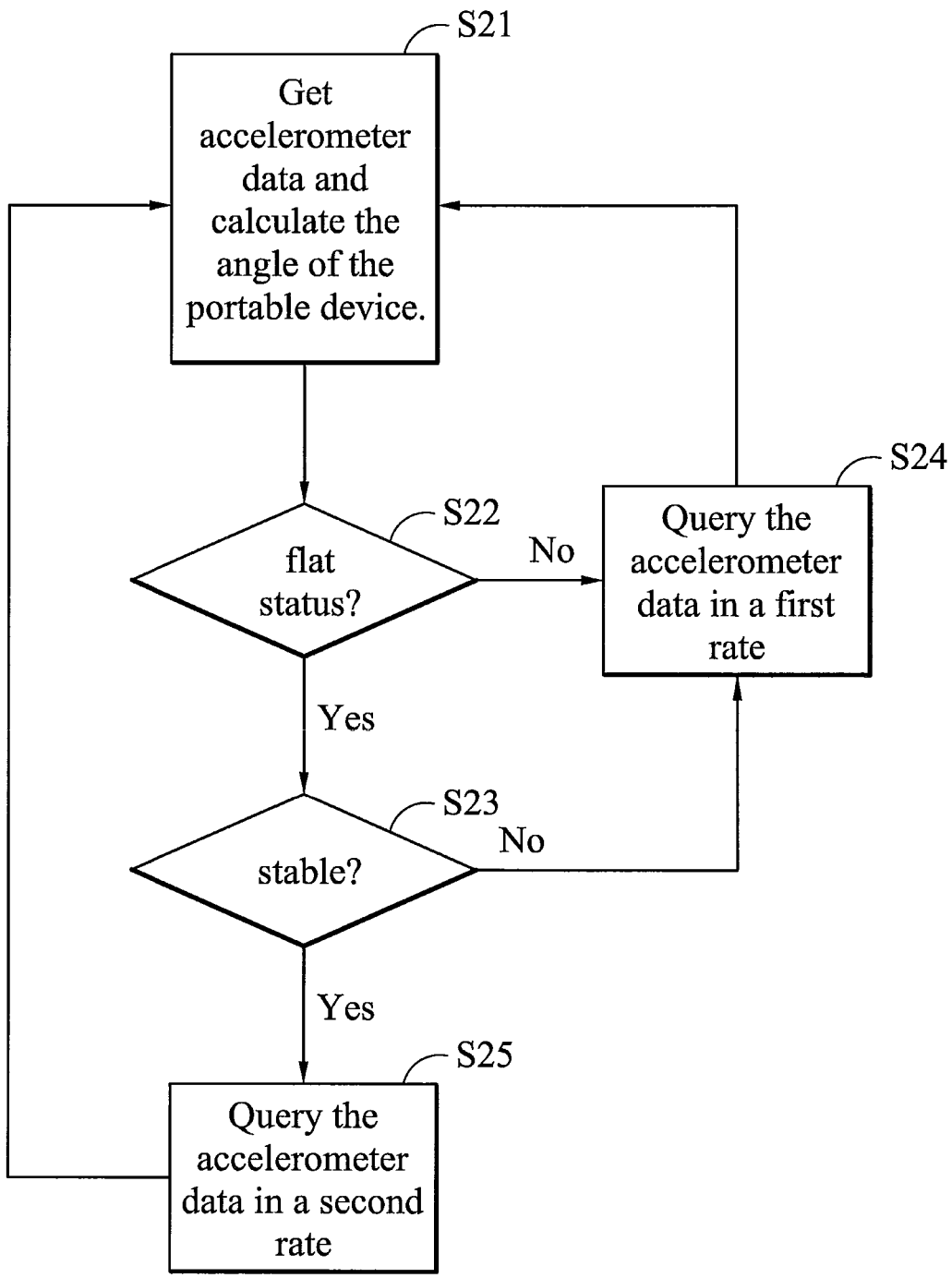
FIG. 2 is a flowchart of an orientation detection algorithm according to another embodiment of the invention.

FIG. 2 is a flowchart of an orientation detection algorithm according to another embodiment of the invention. In step S21, the processor (or called CPU) of the portable device acquires the accelerometer data from the accelerometer and calculates a current angle of the portable device. The processor can further determine an orientation direction according to two calculated angles.

After calculating the current angle, step S22 is performed. In step S22, the orientation detection algorithm determines whether the portable device is in a flat status. The flat status is determined according to an absolute value of a tilt angle and a rotation angle of the portable device. If the absolute value is less than Zt and Zr degrees, the portable device is determined to be in a flat status. In other words, if the tilt angle and the rotation angle of the portable device range from −Zt degrees to Zt degrees (tilt angle) and from −Zr to Zr degrees (rotation angle), the portable device is determined to be in a flat status. Note that both the tilt angle and the rotation angle of the portable device are considered for the determination of the flat status of the portable device in this embodiment.

When the portable device is not in the flat status, step S24 is performed. In step S24, the processor queries the accelerometer at a first rate (with S2-A duration as the interval). In other words, the processor sleeps for a first duration (S2-A), such as 200 ms, and then the processor repeats the operation of step S21 to acquire the accelerometer data. When the portable device is in the flat status, step S23 is performed, wherein the processor determines whether the portable device is in a stable condition in step S23. The stable condition is determined according to a second duration (S2-B duration) in which the portable device is in the flat status. If the second duration exceeds a threshold (S2-C duration as threshold), the portable device is determined to be in the stable condition, and step S25 is performed. In one embodiment, the threshold (S2-C) may be 1000 ms. If the second duration does not exceed the threshold, step S24 is performed, wherein the processor sleeps for a first duration (S2-A), such as 200 ms, and then the processor repeats the operation of step S21.

In step S25, the processor queries the accelerometer at a second rate (with S2-D duration as the interval). In other words, the processor sleeps for a third duration (S2-D), such as 600 ms, and then the processor repeats the operation of step S21 to acquire the accelerometer data.

The main feature of the orientation detection algorithm shown in FIG. 2 uses two different query rates for the processor of the portable device. If the portable device is in the flat status and stable, the processor queries the accelerometer at the second rate (with S2-D as the interval), and if the portable device is not in the flat status or is not stable, the processor queries the accelerometer at the first rate (with S2-A as the interval), wherein the first rate is faster than the second rate (with S2-D as the interval).

Figure 3:
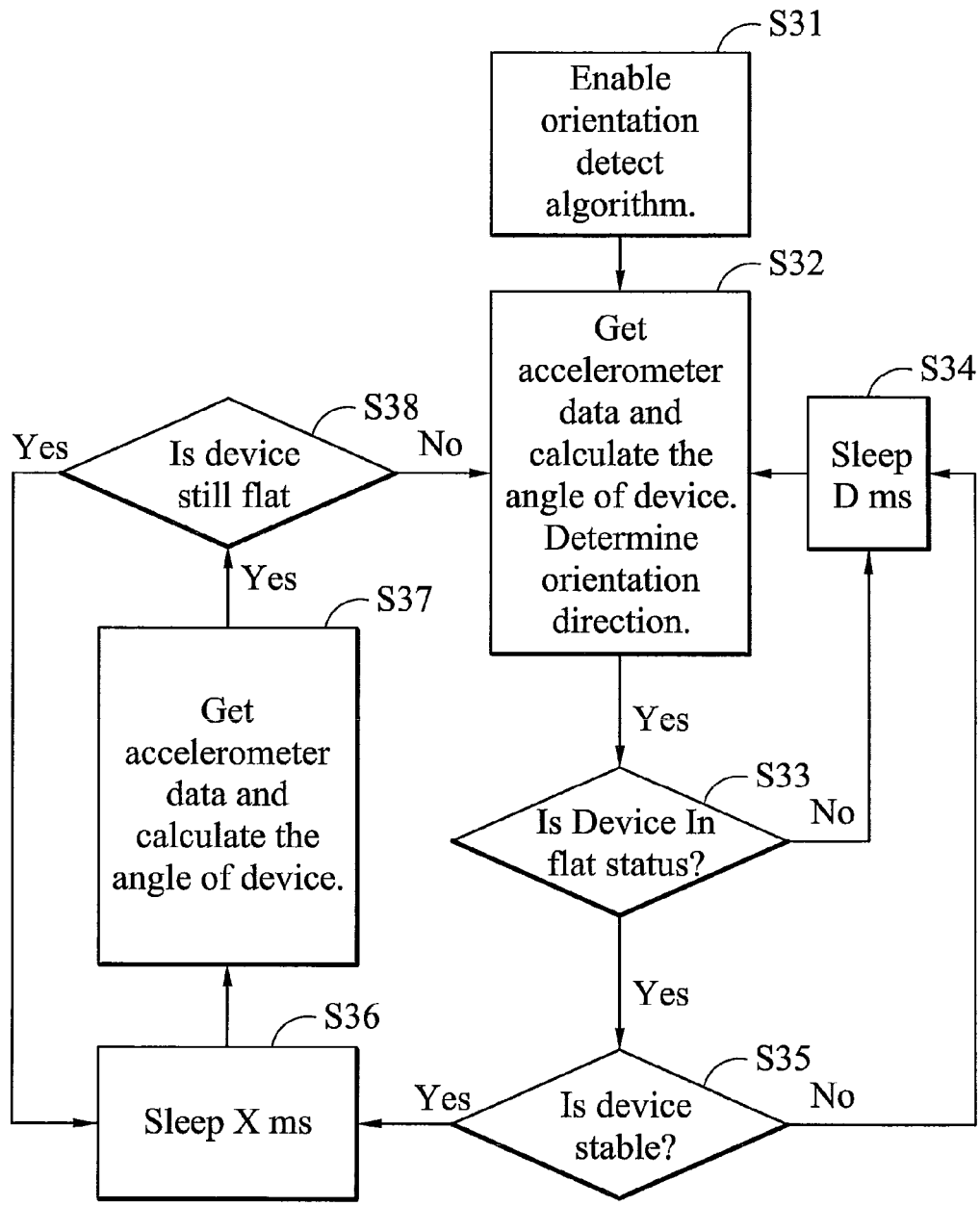
FIG. 3 is a flowchart of an orientation detection algorithm according to another embodiment of the invention.

FIG. 3 is a flowchart of an orientation detection algorithm according to another embodiment of the invention. In step S31, the orientation detection algorithm is enabled. The timing to enable the orientation detection algorithm can be determined according to need of a designer. In step S32, the processor (or called CPU) of the portable device acquires the accelerometer data from the accelerometer and calculates a current angle of the portable device. The processor can further determine an orientation direction according to two calculated angles.

After calculating the current angle, step S33 is performed. In step S33, the orientation detection algorithm determines whether the portable device is in a flat status. The flat status is determined according to an absolute value of a tilt angle and a rotation angle of the portable device. If the absolute value is less than Zt and Zr degrees, the portable device is determined to be in a flat status. In other words, if the tilt angle and the rotation angle of the portable device range from −Zt degrees to Zt degrees (tilt angle) and from −Zr to Zr degrees (rotation angle), the portable device is determined to be in a flat status. Note that both the tilt angle and the rotation angle of the portable device are considered for the determination of the flat status of the portable device in this embodiment.

When the portable device is not in the flat status, step S34 is performed, wherein the processor queries the accelerometer at a first rate (with S3-A duration as the interval). In other words, the processor sleeps for a first duration (S3-A), such as 200 ms, and then the processor repeats the operation of step S32. When the portable device is in the flat status, step S35 is performed, wherein the processor will determine whether the portable device is in a stable condition. The stable condition is determined according to a second duration (S3-B duration) in which the portable device is in the flat status. If the second duration exceeds a threshold (S3-C duration as threshold), the portable device is determined to be in the stable condition, and step S36 is performed. If the second duration does not exceed the threshold, step S34 is performed, wherein the processor sleeps for a first duration (S3-A), such as 200 ms, and then the processor repeats the operation of step S32. In this embodiment, the threshold (S3-C) may be 1000 ms.

In step S36, the processor queries the accelerometer at a second rate (with S3-D duration as the interval). In other words, the processor sleeps for a third duration (S3-D), such as 600 ms, and then the processor repeats the operation of step S32.

Figure 4A:
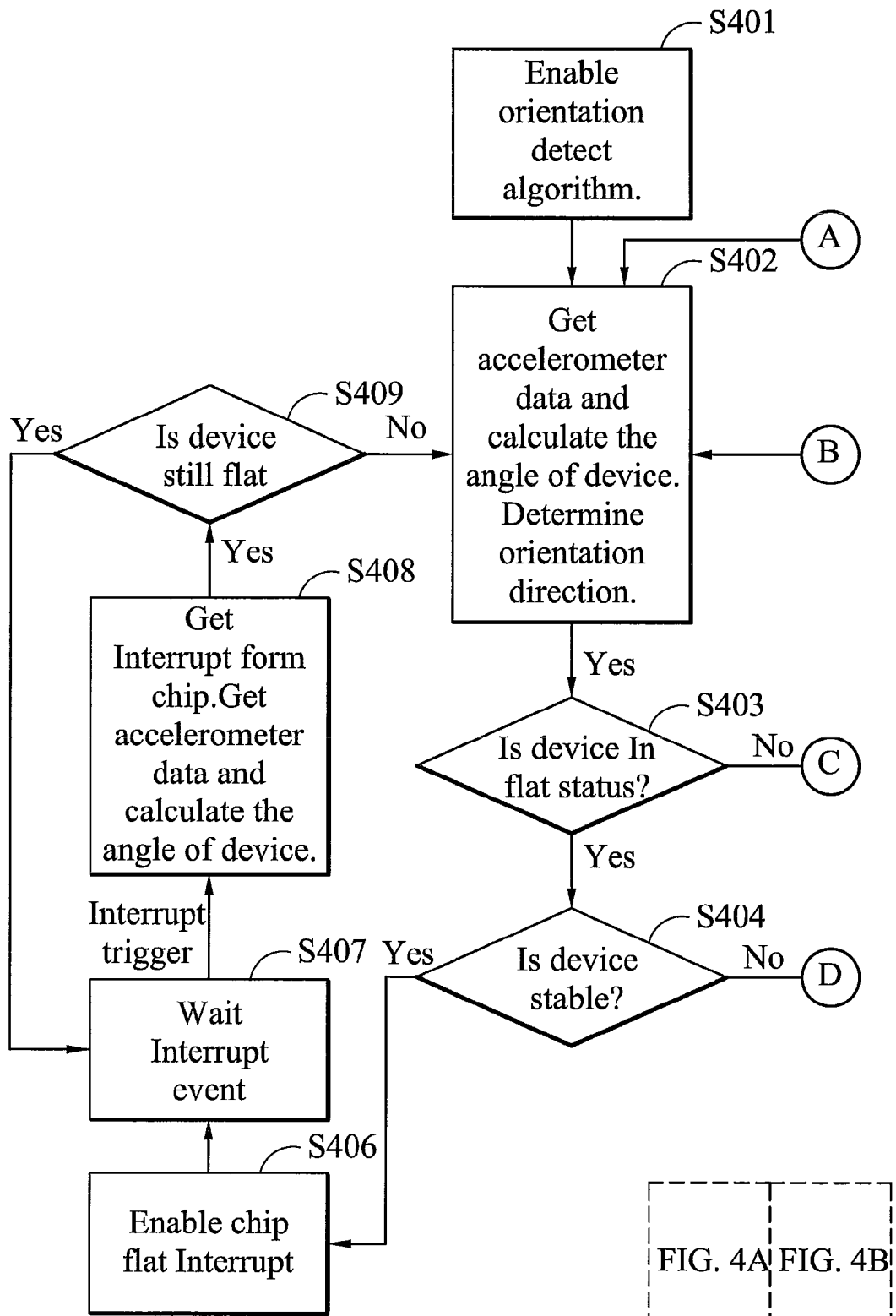
FIGS. 4A and 4B show a flowchart of an orientation detection algorithm according to another embodiment of the invention.
Figure 4B:
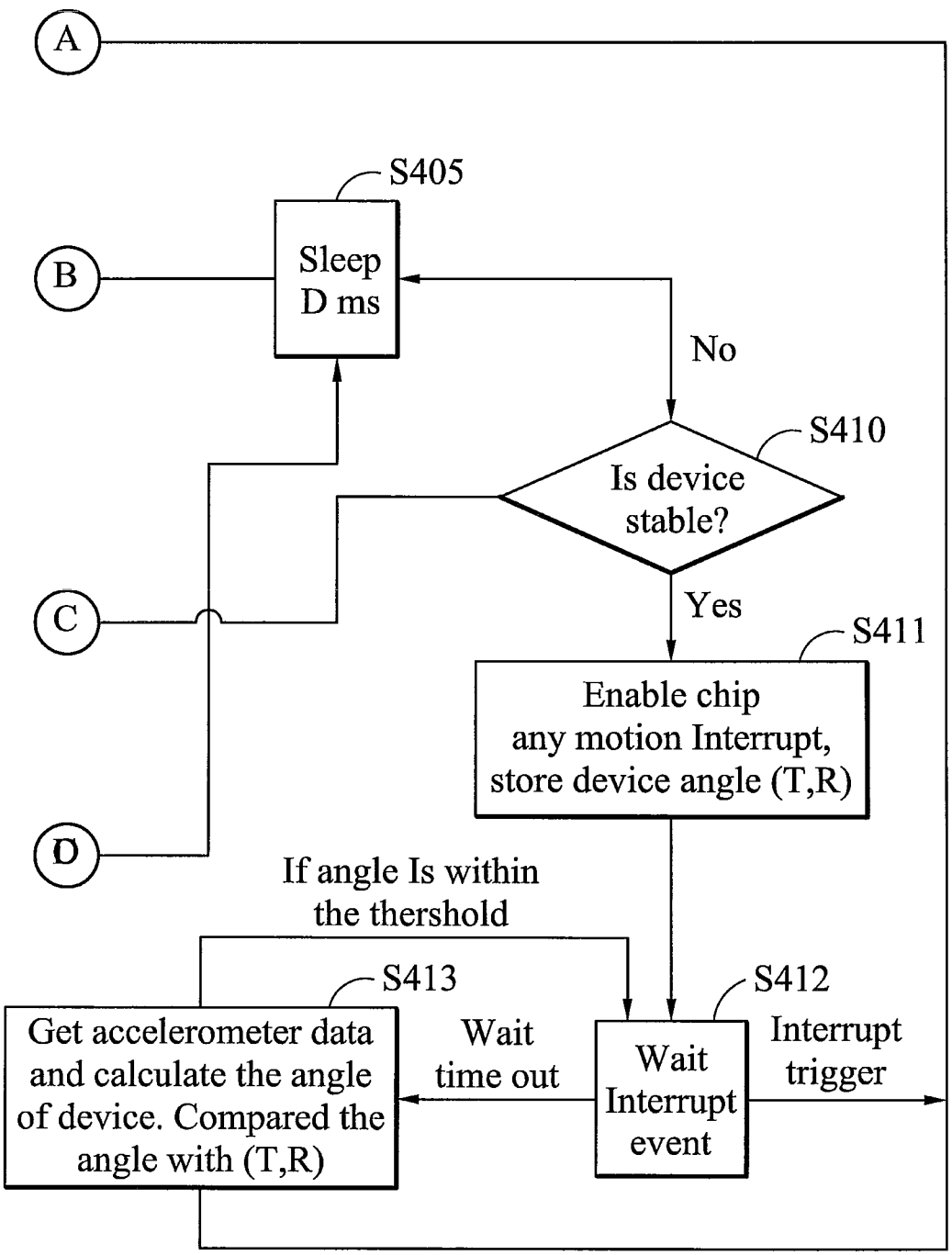

FIGS. 4A and 4B show a flowchart of an orientation detection algorithm according to another embodiment of the invention. In step S401, the orientation detection algorithm is enabled. The timing to enable the orientation detection algorithm can be determined according to need of a designer. In step S402, the processor (or called CPU) of the portable device acquires the accelerometer data from the accelerometer and calculates a current angle of the portable device. The processor can further determine an orientation direction according to two calculated angles.

After estimating the current angle of the portable device, step 403 is performed. In step 403, the orientation detection algorithm determines whether the portable device is in a flat status. The flat status is determined according to an absolute value of a tilt angle and a rotation angle of the portable device. If the absolute value is less than Zt and Zr degrees, the portable device is determined to be in a flat status. In other words, if the tilt angle and the rotation angle of the portable device range from −Zt degrees to Zt degrees (tilt angle) and from −Zr to Zr degrees (rotation angle), the portable device is determined to be in a flat status. Note that both the tilt angle and the rotation angle of the portable device are considered for the determination of the flat status of the portable device in this embodiment.

When the portable device is not in the flat status, step S410 is performed, wherein the processor will determine whether the portable device is in a stable condition. The stable condition is determined according to a second duration (S4-B1 duration) in which the portable device is in the previous status (i.e. no change on tilt and rotation angle). If the second duration doesn't exceed a first threshold (S4-C1 duration as threshold), the portable device is determined to be not in the stable condition, and step S405 is performed. In step S405, the processor sleeps for a first duration (S4-A duration), such as 200 ms, and then the processor repeats the operation of step S402. If the second duration (S4-B1) exceeds a threshold (S4-C1), the portable device is determined as being stable and step S411 is performed.

In step S403, if the portable device is determined as being in the flat status, step S404 is performed. The operation in step S404 is the same as the operation in the step S410, wherein the processor will determine whether the portable device is in a stable condition. The stable condition is determined according to a third duration (S4-B2 duration) in which the portable device is in the flat status. If the third duration (S4-B2) exceeds a second threshold (S4-C2 duration as threshold), the portable device is determined to be in the stable condition, and step S406 is performed. If the third duration does not exceed the second threshold, the portable device is determined as being not stable and step S405 is performed. In step S405, the processor sleeps for a first duration (S4-A), such as 200 ms, and then the processor repeats the operation of step S402. In some situations, the second threshold (S4-C2) can be set to be the same as the first threshold (S4-C1).

In step S406, the processor of the portable device enables a flat interrupt function of the accelerometer. It is noted that not every accelerometer has the flat interrupt function, and the present orientation detection algorithm is customized for those accelerometers with the flat interrupt function. One pin of the accelerometer is coupled to a GPIO pin of the processor of the portable device. When the accelerometer detects that the portable device is not in the flat status, the accelerometer transmits a flat interrupt signal to the processor. In another aspect, the processor monitors the status of the GPIO pin, and when the logic level of the GPIO pin changes, the processor then executes the step S408.

In step S407, the accelerometer waits for the interrupt event. In this embodiment, the interrupt event is the status of the portable device. For example, if the tilt angle or the rotation angle of the portable device exceeds a predetermined angle, the interrupt event is determined to have occurred and the accelerometer outputs a flat interrupt signal to the processor of the portable device. In step S407, the processor of the portable device does not query for the accelerometer data to reduce waste of resources and power consumption of the processor.

In step S408, after the processor receives the flat interrupt signal, the processor acquires the accelerometer data to calculate the tilt angle and the rotation angle of the portable device. Then step S409 is performed to determine whether the portable is still in the flat status. If the processor determines that the portable device is still in the flat status, step S407 is performed. If the processor determines that the portable device is not in the flat status, step S402 performed.

In step S410, if the portable device is determined to be in the stable condition, step S411 is performed, wherein the processor enables any-motion interrupt function of the accelerometer and then stores the current status of the portable device. The current status of the portable device comprises the current tilt angle and the current rotation angle of the portable device. The motion interrupt function triggers an interrupt signal to the processor when the accelerometer has determined that the portable device has been moved or rotated.

In step S412, the processor waits for the interrupt signal triggered by the accelerometer. If the processor receives the interrupt signal from the accelerometer, step S402 is performed, and the processor of the portable device then acquires the accelerometer data from the accelerometer and calculates a first tilt and rotation angles of the portable device. In step S412, when there is no interrupt signal has been triggered for a fourth duration (S4-D duration), such as 1000 ms, wherein thereafter, step S413 is performed. In step S413, the processor of the portable device then acquires the accelerometer data from the accelerometer and calculates a first tilt angle and a first rotation angle. The processor then compares the first tilt angle with the previous stored tilt angle and compares the first rotation angle with the previous stored rotation angle. If angle difference between the first tilt angle and the previous stored tilt angle or angle difference between the first rotation angle and the previous stored rotation angle exceeds a predetermined angle, the processor determines that the portable device has been moved, and step S402 is performed. If angle difference between the first tilt angle and the previous stored tilt angle and angle difference between the first rotation angle and the previous stored rotation angle do not exceed the predetermined angle, the processor determines that the portable device has not moved, and step S412 is performed. In this embodiment, when the steps S411 and S412 are executed, the processor of the portable device does not query the accelerometer to reduce waste of resources and power consumption of the processor.

Figure 5:
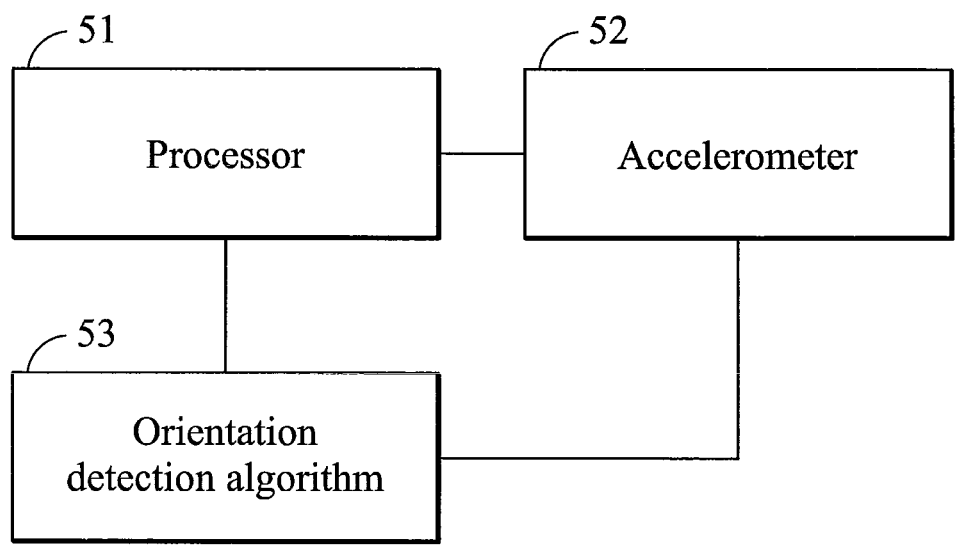
FIG. 5 is a block diagram of a portable device having the described orientation detection mechanism according to an embodiment of the invention.

FIG. 5 is a block diagram of a portable device having the described orientation detection mechanism according to an embodiment of the invention. The processor 51 queries the accelerometer 52 to acquire accelerometer data and estimates a tilt angle and a rotation angle of the portable device. In the conventional design, the processor 51 continuously queries the accelerometer 52 to acquire accelerometer data and this wastes resources and power consumption of the processor. Therefore, the processor 51 executes the orientation detection algorithm 53 to reduce waste of resources and power consumption. For details of the orientation detection algorithm 53, reference may be made to the description and drawing of FIGS. 1-4, and thus, are not described again for briefly.

While the invention has been described by way of example and in terms of the preferred embodiments, it is to be understood that the invention is not limited to the disclosed embodi-

What is claimed is:

1. An orientation detection method for a portable device including a processor, comprising:
the processor of the portable device querying the accelerometer to acquire an accelerometer data;
determining, by the processor, whether the portable device is in a flat status according to the accelerometer data;
determining, by the processor, whether the portable device is in a stable status; and
when the portable device is determined in both the flat status and the stable status by the processor, stopping acquiring the accelerometer data until the processor receives an enable signal, wherein the enable signal is determined by steps of:
estimating a first tilt angle and a first rotation angle of the portable device according to the accelerometer data when the portable device is determined in both the flat status and the stable status;
acquiring a second accelerometer data to estimate a second tilt angle and a second rotation angle of the portable device after stopping acquiring the accelerometer data for a predetermined duration;
when an angle difference between the first tilt angle and the second tilt angle or the first rotation angle and the second rotation angle is larger than a predetermined angle, issuing the enable signal.

2. The method as claimed in claim 1, wherein the flat status is determined by steps of:
estimating a tilt angle of the portable device according to the accelerometer data;
determining whether a first absolute value of the tilt angle is larger than a first predetermined value; and
when the first absolute value is not larger than the first predetermined value, the portable device is determined in a flat status.

3. The method as claimed in claim 1, wherein the flat status is determined by steps of:
estimating a rotation angle of the portable device according to the accelerometer data;
determining whether a second absolute value of the rotation angle is larger than a second predetermined value; and
when the second absolute value is not larger than the second predetermined value, the portable device is determined in a flat status.

4. The method as claimed in claim 1, wherein the stable status is determined according to a second duration in which the portable device is in the flat status.

5. The method as claimed in claim 1, wherein the enable signal is an interrupt signal generated by an accelerometer when the accelerometer detects that the portable device is not in the flat status.

6. The method as claimed in claim 5, wherein the flat status and the stable status is determined by a processor of the portable device and the flat status for the interrupt signal is determined by the accelerometer.

7. The method as claimed in claim 5, further comprising:
determining whether the portable device is in the flat status after receiving the interrupt signal; and
acquiring the accelerometer data when the portable device is determined not in the flat status.

8. The method as claimed in claim 1, further comprising:
stopping acquiring the accelerometer data for a first duration when the portable device is not in the flat status; and
acquiring the accelerometer data to determine whether the portable device is in the flat status after stopping acquiring the accelerometer data for the first duration.

9. The method as claimed in claim 1, further comprising:
stopping acquiring the accelerometer data for a first duration when the portable device is not in the stable status; and
acquiring the accelerometer data to determine whether the portable device is in the flat status after stopping acquiring the accelerometer data for the first duration.

10. The method as claimed in claim 1, wherein the enable signal is generated when stopping acquiring the accelerometer data for a third duration.

11. The method as claimed in claim 10, further comprising:
acquiring the accelerometer data in response to the enable signal to determine whether the portable device is in the flat status;
acquiring the accelerometer data to determine whether the portable device is in a flat status again when the portable device is determined not in the flat status;
stopping acquiring the accelerometer data for the third duration when the portable device is determined in the flat status; and
acquiring the accelerometer data when the portable device is determined not in the flat status.

12. The method as claimed in claim 1, further comprising:
enabling an any-motion detection mechanism;
retrieving a second accelerometer data every fourth duration to estimate an angle of the portable device;
determining whether a movement of the portable device is within a threshold according to the estimated angle; and
when the movement exceeds the threshold, issuing the enable signal.

13. A portable device, comprising:
an accelerometer; and
a processor to query the accelerometer to acquire an accelerometer data to determine whether the portable device is in both a flat status and a stable status, and when the portable device is determined in both the flat status and the stable status, the processor stop querying the accelerometer data until the processor receives an enable signal,
wherein the accelerometer is configure to estimate a first tilt angle and a first rotation angle of the portable device according to the accelerometer data when the portable device is determined in both the flat status and the stable status, and acquire a second accelerometer data to estimate a second tilt angle and a second rotation angle of the portable device after the processor stops querying the accelerometer data for a predetermined duration, and wherein when an angle difference between the first tilt angle and the second tilt angle or the first rotation angle and the second rotation angle is larger than a predetermined angle, the accelerometer is configured to issue the enable signal to the processor.

14. The device as claimed in claim 13, wherein the processor estimates a tilt angle of the portable device according to the accelerometer data and when the processor determines that a first absolute value of the tilt angle is larger than a first predetermined value, the portable device is determined in a flat status.

15. The device as claimed in claim 13, wherein the processor estimates a rotation angle of the portable device according to the accelerometer data and when the processor determines that a first absolute value of the rotation angle is larger than a first predetermined value, the portable device is determined in a flat status.

16. The device as claimed in claim 13, wherein the processor query the accelerometer in a first rate when the portable device is determined not in both the flat status and the stable status, and the processor query the accelerometer in a second rate when the portable device is determined in both the flat status and the stable status.

17. The device as claimed in claim 13, wherein when the processor detects that the portable device is the flat status for a second duration, the portable device is determined in the stable status.

18. The device as claimed in claim 13, wherein the processor enables an any-motion detection mechanism after the portable device is determined in both the flat status and the stable status, the processor queries the accelerometer to acquire a second accelerometer data every fourth duration to estimate an angle of the portable device to determine whether the portable device has been moved, and the enable signal is generated when the portable device is moved.

* * * * *